United States Patent [19]

Spuck et al.

[11] Patent Number: 4,588,090
[45] Date of Patent: May 13, 1986

[54] BLISTER PACK STRIP

[75] Inventors: Gisbert Spuck, Rosbach; Gerhard Ludwig, Weiler, both of Fed. Rep. of Germany

[73] Assignee: Cito-Pac Verpackungsgesellschaft mbH, Rosbach, Fed. Rep. of Germany

[21] Appl. No.: 578,608

[22] Filed: Feb. 13, 1984

Related U.S. Application Data

[63] Continuation of Ser. No. 395,287, Jul. 6, 1982, abandoned.

[30] Foreign Application Priority Data

Jul. 7, 1981 [DE] Fed. Rep. of Germany ....... 3126671

[51] Int. Cl.⁴ .................. B65D 17/28; B65B 47/00
[52] U.S. Cl. .................... 206/532; 53/453; 53/559; 206/277; 206/484.2; 206/524.9; 206/529
[58] Field of Search ............ 206/528, 529, 530, 532, 206/538, 539, 484, 484.1, 277, 484.2, 524.1, 524.9, 524.4, 524.6, 438; 401/132; 604/3, 200, 244; 53/453, 454, 560, 559

[56] References Cited

U.S. PATENT DOCUMENTS

| | | | |
|---|---|---|---|
| 2,597,986 | 5/1952 | Halstead | 53/453 |
| 2,634,857 | 4/1953 | Weckesser | 206/529 |
| 2,691,259 | 10/1954 | Weckesser | 206/529 |
| 2,760,630 | 8/1956 | Lakso | 206/530 |
| 3,039,246 | 6/1962 | David | 206/484 |
| 3,104,665 | 9/1963 | Towns | 206/529 |
| 3,184,121 | 5/1965 | Volckening | 206/277 |
| 3,206,908 | 9/1965 | Bodet | 206/484 X |
| 3,245,197 | 4/1966 | Van Mil, Jr. et al. | 53/453 |
| 3,503,493 | 3/1970 | Nagy | 206/484 |
| 3,759,371 | 9/1973 | Marks | 206/484 |
| 3,782,066 | 1/1974 | Schmitt | 53/543 |
| 3,835,995 | 9/1974 | Haines | 206/484 |
| 3,862,684 | 1/1975 | Schmitt | 206/484 |
| 3,912,082 | 10/1975 | Gerner et al. | 206/484 |
| 4,089,415 | 5/1978 | Laib | 206/484.2 |
| 4,209,096 | 6/1980 | Carkhuff | 206/484 |
| 4,211,326 | 7/1980 | Hein et al. | 206/484 |
| 4,218,155 | 8/1980 | Weidner | 401/132 |
| 4,236,652 | 12/1980 | Beguhn | 206/484 |

FOREIGN PATENT DOCUMENTS

| | | |
|---|---|---|
| 1011259 | 6/1952 | France . |
| 1228257 | 6/1962 | France . |
| 2320727 | 11/1977 | France . |
| 582666 | 11/1946 | United Kingdom . |

*Primary Examiner*—George E. Lowrance
*Assistant Examiner*—Bryon Gehman
*Attorney, Agent, or Firm*—Fay, Sharpe, Fagan, Minnich & McKee

[57] ABSTRACT

A blister pack strip comprises two congruent deep-drawn carrier foils (1) of polystyrene. Each foil (1) has a thickness of between 130 and 190μ. The foils (1) are coated on their facing surfaces with polyethylene (2) having a thickness of between 40 and 50μ, are welded together in mirror image to form a plurality of pockets (7), and define a plurality of inlet funnels (4) along one edge of the strip communicating with respective pockets. Each inlet funnel (4) is at least partly closed by a weld bridge (5). Welded-up squirt nozzles (8) communicating with each pocket (7) are formed on the side of the strip opposite to the inlet funnels (4), and a groove (9) is provided transversely to the squirt nozzles (8) and parallel with the adjacent edges of the carrier foils (1).

11 Claims, 2 Drawing Figures

BLISTER PACK STRIP

This application is a continuation of 395,287, filed July 6, 1982, now abandoned.

The invention relates to a blister pack strip of the kind comprising two congruent deep-drawn carrier foils which are coated on their facing surfaces with polyethylene and are welded together in mirror image to form a plurality of pockets, the foils defining inlet funnels along one edge of the strip communicating with respective pockets.

A blister pack strip of this kind is described in German Utility Model Specification No. 1959479 for the reception of suppositories, and as compared with welded foil pouches has the advantage that the article is accommodated in an inherently stable manner. The inlet funnel enables insertion of the suppositories by machine in the pharmaceutical factory; it is subsequently sealed, for use in the tropics, between the heated cheeks of a press.

However this known pack is not sterile. The blister pack strip is produced in a workshop which processes plastics. During storage and transport to the pharmaceutical manufacturer the dropping of germs into the pockets in the pack, encouraged by the funnel shape of the inlet opening, cannot be avoided. For opening one unit of the pack the user does not always have scissors available and then tries to tear off the sealed inlet funnel. Because of the considerable resistance to tearing of the carrier foils, which in the case of the known blister pack strip consist of polyvinyl chloride, it is only possible to do this, if at all, by the application of considerable force. Sensitive articles would then be damaged during unpacking. The known blister pack strip is therefore intended and suitable only for suppositories which at room temperature are to some extent stable and do not have to be applied in an absolutely sterile condition, although that would be desirable.

In accordance with one aspect of the present invention, a blister pack strip comprises two congruent deep-drawn carrier foils of polystyrene, each foil having a thickness of between 130 and 190$\mu$, the foils being coated on their facing surfaces with polyethylene having a thickness of between 40 and 50$\mu$, being welded together in mirror image to form a plurality of pockets, and defining a plurality of inlet funnels along one edge of the strip communicating with respective pockets, wherein each inlet funnel is at least partly closed by a weld bridge, welded-up squirt nozzles communicating with each pocket are formed on the side of the strip opposite to the inlet funnels, and a groove is provided transversely to the squirt nozzles and parallel with the adjacent edges of the carrier foils.

This blister pack strip is usable under sterile conditions for the reception and handy removal of sensitive solid, pasty and also liquid materials. The combination of material and thickness of the carrier foils yields a satisfactory stability in the shape of the strip and a surprisingly low resistance to tearing, so that the user can remove even sensitive goods without the use of scissors or a knife. The weld bridge at the edge of the inlet funnel enables packing of the strip to be carried out free of germs and without any additional outlay in material and production.

In accordance with another aspect of the present invention, in a method of manufacturing a blister pack strip the carrier foils are first heated in sections up to a welding temperature and then deep-drawn and pressed together; and shortly after the pressing step the substantially uninterrupted weld bridge is pressed in a separate working step.

This method is particularly advantageous because during the heating up of the carrier foils in conventional automatic welding machine, directly preceding the deep-drawing and welding, the foils and also the surrounding air cushion are sterilized. If the weld bridge at the edge of the inlet funnel leaves a small opening during the solidification of the pack strip, the air enclosed in the strip will cool down, its volume will reduce and it will suck in after it a little of the air in the welding tool, which was likewise sterilized previously by the welding process, through the small opening in the weld bridge. Thus an equalization of pressure takes place and undesirable deformation of the carrier foils as they gradually solidify in the welding tool is prevented. Since the pressure equalizing opening in the weld bridge is small and is not funnel-shaped no significant attack by germs can occur during storage and transport of the blister pack strip to the pharmaceutical manufacturer. The small equalizing opening may be utilized by the pharmaceutical manufacturer for supplying the pocket with a liquid or pasty medicament via a double-walled injector tube. The goods are supplied through the inner tube while the outer tube lets air, which is compressed as the pocket is filled, escape, after which the opening is sealed.

In the case of particularly strict requirements as regards freedom from germs the inlet funnel may be completely closed by the weld bridge, but in that case the corresponding press tools in the welding station must be slightly delayed in time relatively to the action of the press tools for pressing together the two deep-drawn carrier foils, so that within the delay time of about one second the equalization of pressure may take place.

This blister pack strip is particularly versatile and handy through provision of the squirt-nozzles, for a liquid medicament. Removal of the medicament by the user is then effected by tearing or cutting off the edges of the carrier foils along the, preferably stamped, groove of one pack strip unit, or even a needle may be pushed into the squirt-nozzle opened in that way, whereby the disposable pack is converted into a disposable syringe of very good value.

Figure 1:
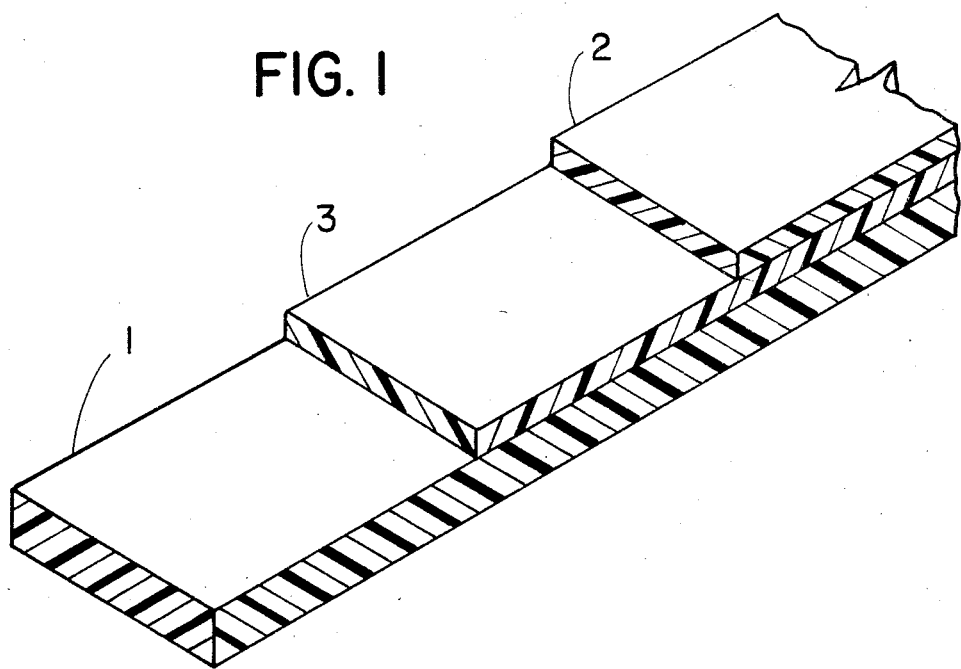
FIG. 1 is a cutaway view showing the multilayer foil structure.
Figure 2:
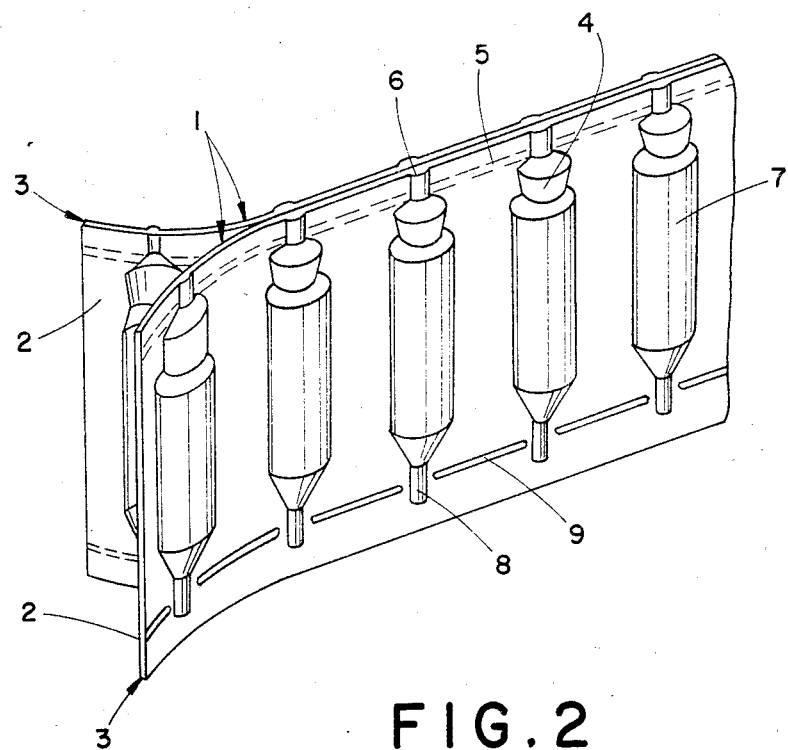
FIG. 2 is a perspective view of the blister pack strip.

An example of a blister pack strip according to the present invention is illustrated in FIG. 2 which is a perspective view of part of a strip with part of the foils spread apart. As shown in FIG. 1 the blister pack strip comprises two congruent deep-drawn carrier foils 1 of polystyrene, approximately 140$\mu$ thick and connected on the inside to a polyethylene weld coating 2 via an adhesive coating 3 of polyurethane. Alternatively, the weld coating 2 is connected to the foil 1 by a hydrophilizing or polarizing zone. Pockets 7 are formed by the foils 1 for the reception of the goods.

An inlet funnel 4 communicating with each pocket 7 formed by the foils is almost completely closed at the edge of the strip by a narrow weld bridge 5. A small pressure-equalizing opening 6 is left, however.

A squirt-nozzle 8 extends from an end at each pocket 7 opposite to the inlet funnel 4. Across the ends of the squirt-nozzles in parallel with the adjacent edges of the carrier foils 1 runs a stamped groove 9 closure which enables a small strip of the foils 1 to be torn or cut off to open the squirt-nozzles 8.

We claim:

1. A blister pack strip, which is adapted to receive a medicine, and having two congruent cupped plastic foils, which are welded together in mirror image, and form elongated pockets each provided with a filling funnel, characterized in that the elastic form-stable filling funnel is closed over its edge by a welding seam running parallel to the edge of the foils, the foils each consisting on the outside of a polystyrene layer, approximately 140 microns thick, and on the inside a polyethylene layer 40 to 50 microns thick, said two inside layers being joined to each other and further comprising:

a plurality of welded-up squirt nozzles, one communicating with each pocket, said squirt nozzles being provided along an edge of said strip opposite to said filling funnels; and a groove provided transversely to said squirt nozzles and parallel with an adjacent edge of the strip.

2. The blister pack strip of claim 1 wherein said groove is provided to enable a small section of said strip to be easily removed during the process of opening said squirt nozzles.

3. A blister pack strip according to claim 1, characterized in that the polystyrene layer and the polyethylene layer are joined together by a glue layer of polyurethane.

4. A blister pack strip comprising:

two congruent deep drawn carrier foils of polystyrene, each foil having a thickness of up to 190 microns;

a coating of polyethylene having a thickness of up to 50 microns on facing surfaces of said two congruent carrier foils, wherein said two carrier foils are welded together in mirror image to form a band-like strip with a plurality of pockets therein;

a plurality of inlet funnels positioned along one edge of the strip, each funnel communicating with a respective pocket;

a weld bridge provided across at least a portion of each of said inlet funnels;

to form a respective pressure equalizing opening in an area of said funnel not closed by said weld bridge; and, a plurality of squirt nozzles, one communicating with each pocket, said squirt nozzles being positioned on the side of the strip opposite to the inlet funnels.

5. The blister pack strip of claim 4 wherein each carrier foil is joined to its polyethylene coating by a coating of polyurethane.

6. The blister pack strip of claim 4 wherein each carrier foil is joined to its polyethylene coating by a hydrophilizing zone.

7. The blister pack strip of claim 4 wherein each carrier foil is joined to its polyethylene coating by a polarizing zone.

8. The blister pack strip of claim 4 further comprising a groove which is provided transversely to the squirt nozzles and parallel with an adjacent edge of the carrier foils, said groove being provided to enable a small section of said two foils to be easily removed during the process of opening said squirt nozzles.

9. The blister pack of claim 8, wherein said weld bridge is disposed across at least a portion of the edges of said inlet funnels nearest to said edge of said strip to define said pressure equalizing openings, whereby said pressure equalizing openings have a considerably smaller cross-sectional dimension for communication than said inlet funnels.

10. A method of manufacturing a blister pack strip provided with contents, comprising:

heating a pair of carrier foils up to welding temperature;

deep drawing each of said carrier foils to create a plurality of pocket halves and adjacent inlets and opposed, adjacent squirt nozzles;

pressing said pair of carrier foils together to create a blister pack strip, said squirt nozzles being closed during said step of processing and said inlets being left open to provide communication with the pockets;

at a later time pressing a substantially uninterrupted weld bridge into the blister pack strip adjacent to an edge of said strip and across at least a portion of each said inlet nearest to said edges;

subsequently filling said blister pack strip with sterile contents; and sealing said openings.

11. The method of claim 10 wherein said non-funnel shaped opening is a pressure equalizing opening in said blister pack strip, said opening preventing deformation of said blister pack strip due to air pressure differentials.

* * * * *